US012646124B2

(12) United States Patent
Feng et al.

(10) Patent No.: US 12,646,124 B2
(45) Date of Patent: *Jun. 2, 2026

(54) POWER GRID RESOURCE ALLOCATION

(71) Applicant: HITACHI ENERGY LTD, Zürich (CH)

(72) Inventors: Xiaoming Feng, Cary, NC (US); Khosrow Moslehi, Palo Alto, CA (US)

(73) Assignee: HITACHI ENERGY LTD, Zurich (CH)

( * ) Notice: Subject to any disclaimer, the term of this patent is extended or adjusted under 35 U.S.C. 154(b) by 438 days.

This patent is subject to a terminal disclaimer.

(21) Appl. No.: 18/454,122

(22) Filed: Aug. 23, 2023

(65) Prior Publication Data

US 2023/0394604 A1 Dec. 7, 2023

Related U.S. Application Data

(63) Continuation of application No. 16/859,687, filed on Apr. 27, 2020, now Pat. No. 11,783,435.

(51) Int. Cl.
G06Q 50/06 (2024.01)
G05B 13/04 (2006.01)
(Continued)

(52) U.S. Cl.
CPC ............. G06Q 50/06 (2013.01); G05B 13/04 (2013.01); G05F 1/66 (2013.01); G06Q 10/04 (2013.01);
(Continued)

(58) Field of Classification Search
CPC .... G06Q 10/04; G06Q 10/0631; G06Q 50/06; G05B 13/04; G05F 1/66; H02J 3/28; H02J 3/38; H02J 3/466
(Continued)

(56) References Cited

U.S. PATENT DOCUMENTS 8,412,551 B2 4/2013 Feng et al.
8,626,351 B2 * 1/2014 Hirato .................... H02J 3/008
60/39.12
(Continued)

FOREIGN PATENT DOCUMENTS

CN 104701867 A 6/2015
JP H11259450 A 9/1999
(Continued)

OTHER PUBLICATIONS

Yuan Xiaohui, Yuan Yanbin, Zhang Yongchuan, "A survey of modern intelligence optimization methods for unit commitment in electric power systems", Electric Power Automation Equipment , Feb. 25, 2003, vol. 23, No. 2; pp. 73-78.
(Continued)

*Primary Examiner* — Crystal J Barnes-Bullock
(74) *Attorney, Agent, or Firm* — Slater Matsil, LLP

(57) ABSTRACT

Embodiments of the disclosure includes operating a power grid, including: generating, by a power management system of the power grid, a power grid resource allocation profile indicative of an operation of the power grid constrained by operational information of the power grid; generating a difference between a value of upper bounds from a plurality of obtained convergence paths and a value of lower bounds from the obtained convergence paths, the obtained convergence paths being based on a plurality of different initial conditions for the generated power grid resource allocation profile; and generating a resource allocation schedule for power grid resources operating within the power grid if the generated difference is smaller than a pre-determined threshold, the resource allocation schedule corresponding to a convergence path associated with the value of the upper bounds, the resource allocation schedule being configured to be received at the power grid resources.

20 Claims, 10 Drawing Sheets

(51) Int. Cl.

| | |
|---|---|
| *G05F 1/66* | (2006.01) |
| *G06Q 10/04* | (2023.01) |
| *G06Q 10/0631* | (2023.01) |
| *H02J 3/28* | (2006.01) |
| *H02J 3/466* | (2026.01) |

(52) U.S. Cl.
CPC ............ *G06Q 10/0631* (2013.01); *H02J 3/28* (2013.01); *H02J 3/466* (2020.01)

(58) Field of Classification Search
USPC ........................................................ 700/295
See application file for complete search history.

(56) References Cited

U.S. PATENT DOCUMENTS

| | | | | |
|---|---|---|---|---|
| 9,563,924 | B2 * | 2/2017 | Ghosh | G06Q 30/0206 |
| 10,211,638 | B2 * | 2/2019 | Do Rosario | H02J 3/381 |
| 11,201,469 | B2 * | 12/2021 | Zimmanck | H02J 3/381 |
| 11,569,661 | B2 * | 1/2023 | Schmidt | H02J 13/00036 |
| 12,068,602 | B2 * | 8/2024 | Ratnayake | G05B 19/042 |
| 12,348,356 | B2 * | 7/2025 | Fazzari | H04L 41/0659 |
| 2014/0365024 | A1 | 12/2014 | Ghosh et al. | |
| 2018/0060777 | A1 | 3/2018 | Sun et al. | |
| 2019/0286993 | A1 | 9/2019 | Pan et al. | |
| 2022/0398480 | A1 * | 12/2022 | Bai | G06N 3/084 |

FOREIGN PATENT DOCUMENTS

| | | | |
|---|---|---|---|
| JP | 2012068947 A | * | 4/2012 |
| JP | 2013109431 A | | 6/2013 |
| JP | 2021033633 A | | 3/2021 |

OTHER PUBLICATIONS

You, S., et al "Co-optimizing generation and transmission expansion with wind power in large-scale power grids Implementation in the US Eastern Interconnection," Electric Power Systems Research, vol. 133, 2016, pp. 209-218, ISSN 0378-7796, https://doi.org/10.1016/j.epsr.2015.12.023. (https://www.sciencedirect.com/science/article/pii/S0378779615004009).

Wu, et al., "Security-Constrained Unit Commitment Based on a Realizable Energy Delivery Formulation," Mathematical Problems in Engineering, Hindawi Publishing Corporation, vol. 2012, Article ID 178193, 22 pages.

* cited by examiner

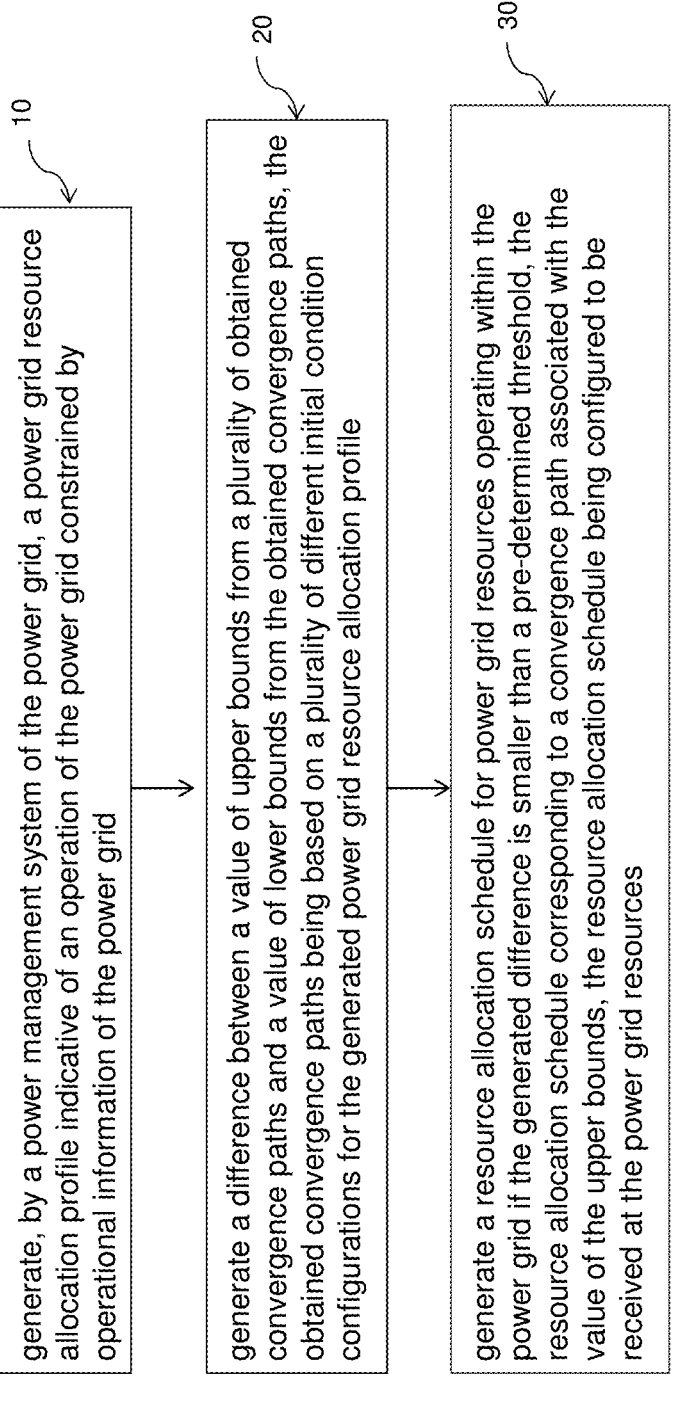

generate, by a power management system of the power grid, a power grid resource allocation profile indicative of an operation of the power grid constrained by operational information of the power grid generate a difference between a value of upper bounds from a plurality of obtained convergence paths and a value of lower bounds from the obtained convergence paths, the obtained convergence paths being based on a plurality of different initial condition configurations for the generated power grid resource allocation profile generate a resource allocation schedule for power grid resources operating within the power grid if the generated difference is smaller than a pre-determined threshold, the resource allocation schedule corresponding to a convergence path associated with the value of the upper bounds, the resource allocation schedule being configured to be received at the power grid resources

Fig. 2

POWER GRID RESOURCE ALLOCATION

PRIORITY CLAIM AND CROSS-REFERENCE

This application is a continuation of U.S. patent application Ser. No. 16/859,687, entitled "Power Grid Resource Allocation," filed on Apr. 27, 2020, now U.S. Pat. No. 11,783,435, issued Oct. 10, 2023, which application is incorporated herein by reference.

TECHNICAL FIELD

The present disclosure relates generally to power grids and operation of power grids, and, in particular embodiments, to power grid resource allocation.

BACKGROUND

Independent system operators (ISOs) use unit commitment (UC) to obtain generation resource and demand (which may be price sensitive) commitment and dispatch in a power grid. Unit commitment determines the commitment states and generation levels of all generators over the scheduling horizon to minimize the total generation cost while meeting all system-wide constraints, such as system load balance and spinning reserve requirements, and individual unit operating constraints. Unit commitment is often formulated as a mixed integer linear programming (MILP) problem.

Since a typical power grid is being driven to operate more and more close to its security margin, security-related transmission constraints are included to constrain the unit commitment. Therefore, typical power system resources scheduling involves security constrained unit commitment (SCUC), where the security constraints may be, e.g., transmission line thermal capacity constraints for the base case operating condition and contingent operating conditions. SCUC is used in day ahead, intra-day, and real time power grid scheduling. In solving for security constrained unit commitment, the minimum-cost operation schedule for generators (may also be referred to as power plants) is determined over a scheduling horizon. For example, a minimum-cost operation schedule is identified that satisfies the operation constraints of each generator unit, the electric network constraints in the base case network topology, and various operator specified contingency scenarios.

SUMMARY

In some embodiments, a method of operating a power grid includes: generating, by a power management system of the power grid, a power grid resource allocation profile indicative of an operation of the power grid constrained by operational information of the power grid; generating a difference between a value of upper bounds from a plurality of obtained convergence paths and a value of lower bounds from the obtained convergence paths, the obtained convergence paths being based on a plurality of different initial conditions for the generated power grid resource allocation profile; and generating a resource allocation schedule for power grid resources operating within the power grid if the generated difference is smaller than a pre-determined threshold, the resource allocation schedule corresponding to a convergence path associated with the value of the upper bounds, the resource allocation schedule being configured to be received at the power grid resources.

In some embodiments, a system is configured to: generate, by a processor of a power management system of a power grid, a power grid resource allocation profile indicative of an operation of the power grid constrained by operational information of the power grid; generate, by the processor, a difference between a value of upper bounds from a plurality of obtained convergence paths and a value of lower bounds from the obtained convergence paths, the obtained convergence paths being based on a plurality of different initial conditions for the generated power grid resource allocation profile; and generate, by the processor, a resource allocation schedule for power grid resources operating within the power grid if the generated difference is smaller than a pre-determined threshold, the resource allocation schedule corresponding to a convergence path associated with the value of the upper bounds, the resource allocation schedule being configured to be received at the power grid resources.

BRIEF DESCRIPTION OF THE DRAWINGS

The details of one or more embodiments of the disclosure are set forth in the accompanying drawings and the description below. Other features, objects, and advantages of the disclosure will be apparent from the description and drawings, and from the claims. In the figures, identical reference symbols generally designate the same component parts throughout the various views, which will generally not be re-described in the interest of brevity. For a more complete understanding of the disclosure, reference is now made to the following descriptions taken in conjunction with the accompanying drawings, in which:

FIG. 2 illustrates a flow chart of a method for operating a power grid, in some embodiments;

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Solving large scale security constrained unit commitment can take tremendous time and computational resources due to its huge dimensions and complexity. Embodiments of the present disclosure describe a power management system that can solve for security constrained unit commitment with improved efficiency and reduced computational time.

Figure 1:
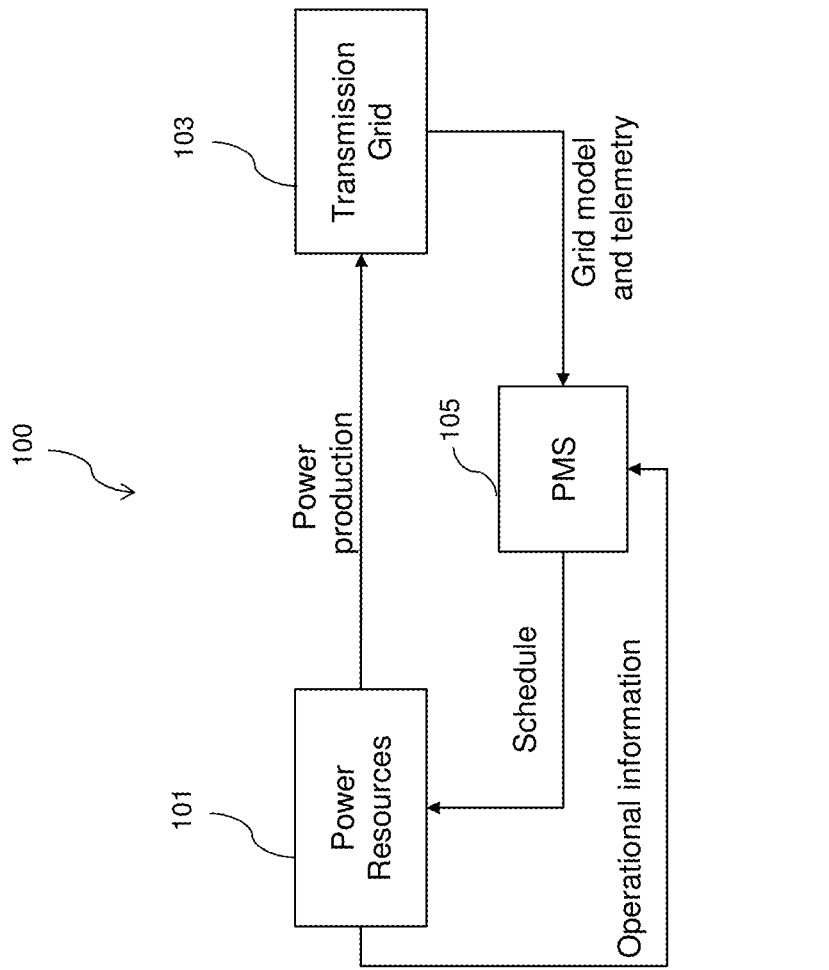
FIG. 1 illustrates a block diagram of a power grid having a power management system (PMS) in a control loop of the power grid, in some embodiments.

FIG. 1 illustrates a block diagram of a power grid 100, in some embodiments. The power grid 100 (may also be referred to as a power system) includes a plurality of power resources 101 (e.g., power generators, or energy storage systems). The power resources 101 may be of different types, such as thermal power plants (e.g., coal, natural gas, nuclear power plants), hydro power plants, renewable resource power plants (e.g., wind farms, solar plants), energy storage systems, and demand response programs. Depending on the power plant type, each of the power resources 101 may be subject to complex technical and business constraints, such as minimum up/down time, ramp up/down rate, modulation/stability (e.g., a unit may not change its production level too many times), and start-up/shut-down ramp rate (e.g., when starting/stopping, a unit follows a specific power curve which may depend on how long the plant has been offline/online).

The power grid 100 also includes a transmission grid 103, which is the electrical grid that delivers electricity generated by the power resources 101 (e.g., power plants) to consumers. The transmission grid 103 is an interconnected network that may span a wide geographical region (e.g., a country). The complex characteristics of the transmission grid 103, such as network topology, device equipment parameters, and line flow limits, as well as resource response rates may need to be considered in solving the security constrained unit commitment system.

As illustrated in FIG. 1, the power grid 100 further includes a power management system (PMS) 105, which may be a market management system (MMS) or an emergency management system (EMS). The PMS 105 may include various functional blocks for implementing various functions, such as processing blocks 10-30 of the method described in FIG. 2. For example, the PMS 105 may include a Clearing Engine that runs market scheduling applications to clear market, to determine market clearing prices for energy and ancillary services (such as various reserves and responses), and to schedule commitment and dispatches for reliability.

In some embodiments, the Clearing Engine solves the security constrained unit commitment system to provide a resource allocation schedule for the power grid 100. The resource allocation schedule may include commitment decisions (e.g., whether a power plant is online and able to produce energy at any time instant), production (also called dispatch) decisions (e.g., how much energy a power plant is producing at anytime instant), and controllable network element decisions (e.g., power flows on HVDC transmission lines and AC transmission lines with phase angle regulators). The resource allocation schedule may also be referred to as an operation schedule of the power grid 100.

In some embodiments, the resource allocation schedule are generated by solving the security constrained unit commitment system while taking into consideration of the operational information (e.g., various constraints) of the power grid 100, such as the constraints of the power resources 101 (e.g., generation capacity and operating margin including safe operating ranges), constraints of the transmission grid 103, market information (e.g., bidding information, cost information, predicted demand information, regulatory requirements such as emission target). The goal of the resource allocation schedule is to clear market offer and bid while maximizing total welfare or minimize total cost. In one example embodiment, the goal may be to satisfy energy demand that minimizes energy production costs while being subject to the constraints of reliability and emissions. In another example embodiment, the goal may be to maximize energy production profits, e.g., the difference between revenues (from sales of electricity) and costs (from production of electricity).

FIG. 2 illustrates a flow chart of a method for operating a power grid, in some embodiments. It should be understood that the embodiment method shown in FIG. 2 is merely an example of many possible embodiment methods. One of ordinary skills in the art would recognize many variations, alternatives, and modifications. For example, various processing blocks as illustrated in FIG. 2 may be added, removed, replaced, rearranged and repeated.

Referring to FIG. 2, at block 10, a power grid resource allocation profile indicative of an operation of the power grid constrained by operational information of the power grid is generated by a power management system (PMS) of the power grid. The power management system may be, e.g., a market management system (MMS) or an emergency management system (EMS) of the power grid. In some embodiments, the operational information comprises information for constraining operation of the power grid and comprises security-related transmission constraint information and cost information. In some embodiments, generating the power grid resource allocation profile comprises formulating the power grid resource allocation profile as a Security Constrained Unit Commitment (SCUC) system (or problem) based on mixed integer programming (MIP). In the discussion herein, the term mixed integer programming (MIP) may be used interchangeably with mixed integer linear programming (MILP).

Figure 5:
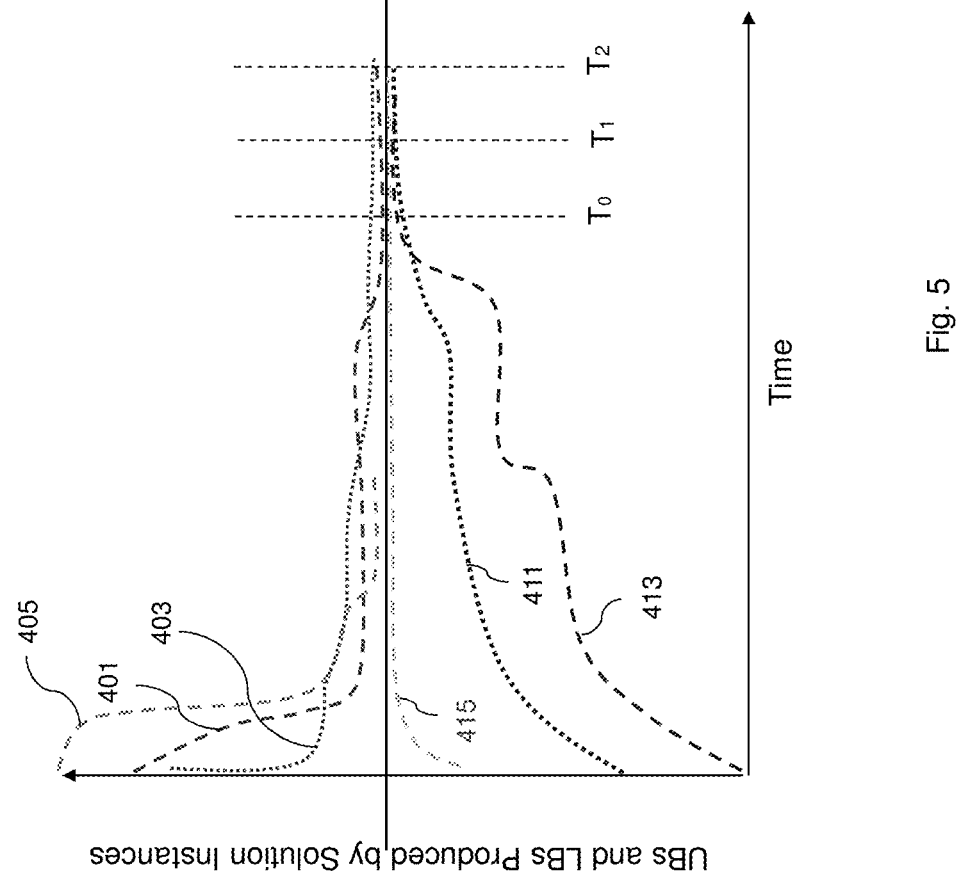
FIG. 5 illustrates a plurality of upper bounds and a plurality of lower bounds of a security constrained unit commitment system along a plurality of convergence paths obtained using a plurality of primal solvers and a plurality of dual solvers, in an embodiment.

Still referring to FIG. 2, at block 20, a difference between a value of upper bounds from a plurality of obtained convergence paths and a value of lower bounds from the obtained convergence paths is generated, where the obtained convergence paths is based on a plurality of different initial condition configurations for the generated power grid resource allocation profile. As discussed hereinafter, FIG. 5 illustrates the upper bounds and the lower bounds for various convergence paths of a plurality of solutions to the security constrained unit commitment system.

In some embodiments, the plurality of obtained convergence paths comprise first convergence paths obtained by solving the power grid resource allocation profile using a plurality of primal problem solver instances (also referred to as primal solver instances), where each of the plurality of primal solver instances is an instance of an MIP solver that solves the SCUC MIP problem using, e.g., the branch-and-bound (B&B) algorithm or the branch-and-cut (B&C) algorithm. In some embodiments, each of the primal solver instances generates an upper bound value and a lower bound value for each (tentative) solution along its convergence path. In some embodiments, each of the plurality of primal problem solver instances is initialized with a different solver configuration (e.g., solver parameters, strategies, and MIP starting solution pool), such that each of the plurality of MIP solver instances converges along a different convergence path. For ease of discussion, a solver instance (e.g., a primary solver instance or a dual solver instance) may be used interchangeably with a solver (e.g., a primary solver or a dual solver) herein.

In some embodiments, at a first instant, each of the plurality of obtained convergence paths comprises an upper bound; at a second instant, each of the plurality of obtained convergence paths comprises a lower bound; and at a third instant, each of the plurality of obtained convergence paths comprises an intermediate resource allocation schedule, where generating the resource allocation schedule comprises choosing the intermediate resource allocation schedule of the convergence path associated with the value of the upper bounds as the resource allocation schedule that is feasible for all the constraints in the SCUC MIP problem. In some embodiments, generating the difference comprises generating the difference between a minimum value of the upper bounds and a maximum value of the lower bounds.

In some embodiments, each of the plurality of primal solvers (e.g., MIP solvers) is configured to generate a mixed-integer solution to the power grid resource allocation profile at the first instant, where the mixed-integer solution has a corresponding upper bound for the power grid resource allocation profile. In some embodiments, each of the plurality of primal solvers is further configured to generate an integer relaxed solution to the power grid resource allocation profile at the second instant, wherein the integer relaxed solution has a corresponding lower bound for the power grid resource allocation profile.

Figure 6:
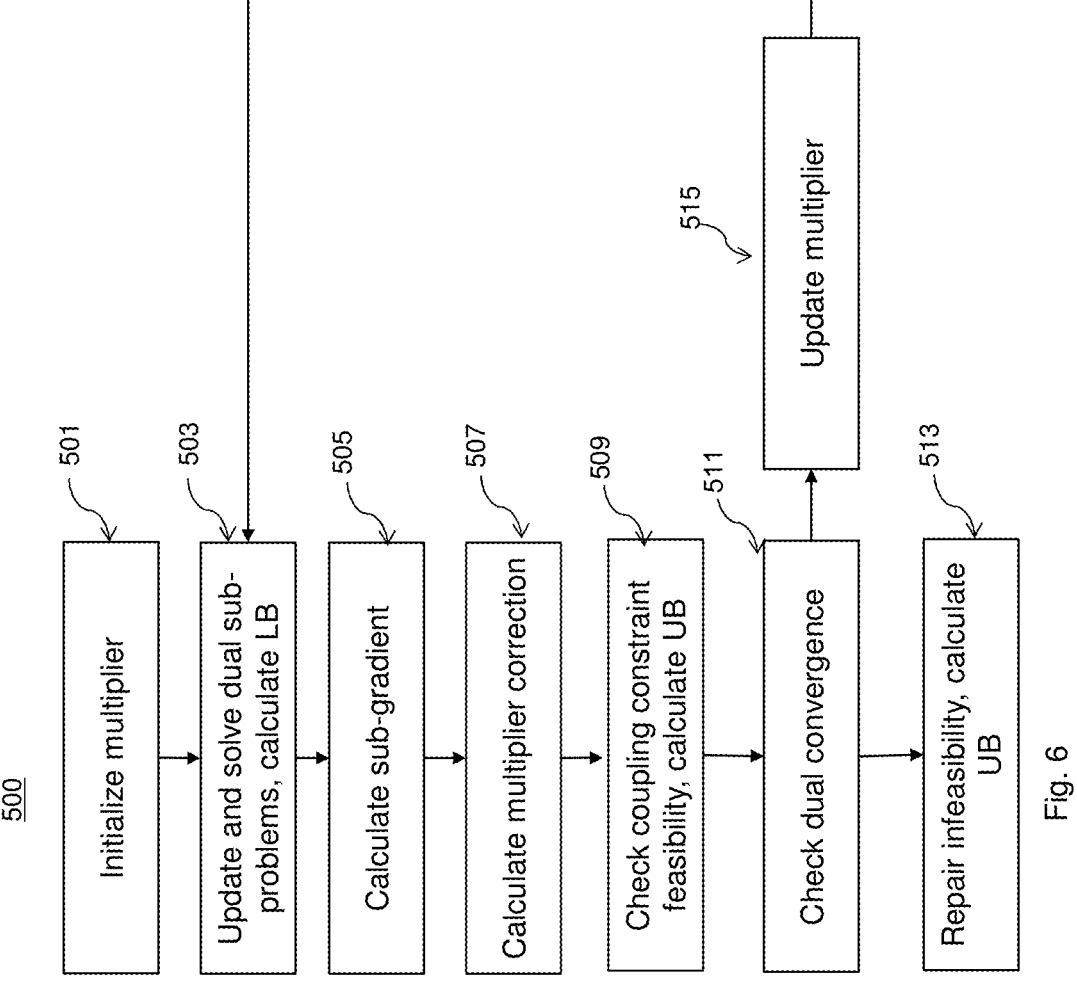
FIG. 6 illustrates a flow chart of a method for solving a Lagrangian Relaxation (LR) of the security constrained unit commitment system, in an embodiment.
Figure 7:
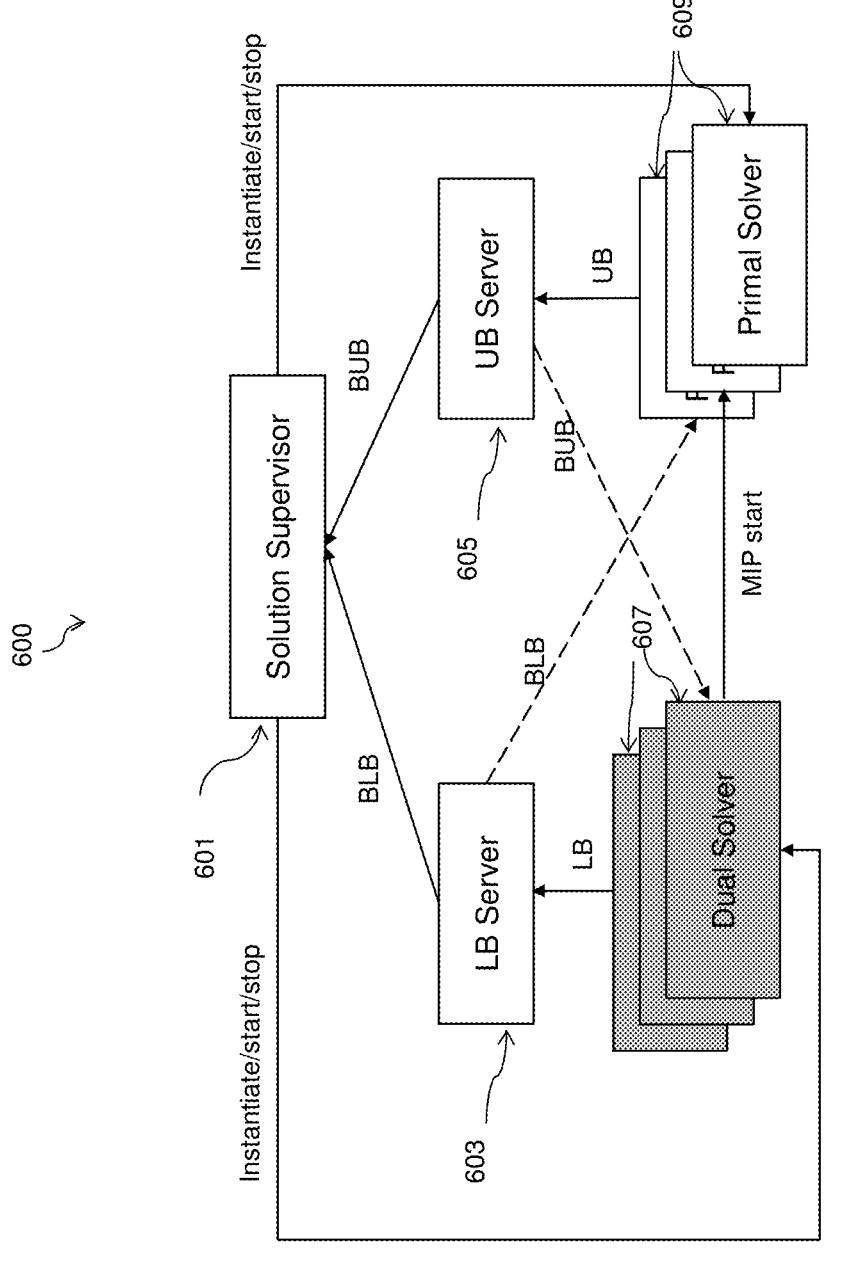
FIG. 7 illustrates a block diagram of a parallel asynchronous collaborative primal dual solver for solving the security constrained unit commitment system, in an embodiment.

In some embodiments, the plurality of obtained convergence paths include second convergence paths obtained by solving a second power grid resource allocation profile different from the power grid resource allocation profile using a second plurality of solvers different from the plurality of primal solvers (e.g., MIP solvers), wherein each of the second plurality of solvers is configured to generate, at the second instant, a solution to the second power grid resource allocation profile that has a corresponding lower bound for the power grid resource allocation profile. In some embodiments, the second power grid resource allocation profile is a Lagrangian Relaxed (LR) function of the power grid resource allocation profile. For example, the LR function of the power grid resource allocation profile may be a dual optimization problem (e.g., a relaxed SCUC MIP problem) using relaxation techniques such as Lagrangian relaxation. The second plurality of solvers may therefore be referred to as dual problem solvers, or dual solvers. In some embodiments, each of the dual problem solvers is configured to generate, at the second instant, a solution to the second power grid resource allocation profile (e.g., LR function) that has a corresponding lower bound and a corresponding upper bound for the power grid resource allocation profile. In some embodiments, the dual optimization problem includes a set of smaller MIP problems resulting from the relaxation of the SCUC problem, which smaller MIP problems can be solved in parallel to reduce computation time. FIG. 6 illustrates a flow chart of a method for solving a Lagrangian Relaxation (LR) of the security constrained unit commitment system, in an embodiment. FIG. 7 illustrates a block diagram of a parallel asynchronous collaborative primal dual solver 600 for solving the security constrained unit commitment system, in an embodiment.

In some embodiments, the first instant, the second instant, and the third instant are a same instant. In some embodiments, the first instant is different from the second instant, where the third instant is the first instant if the first instant is after the second instant, where if the first instant is before the second instant, the third instant is between the first instant and the second instant, is a same as the first instant, or is a same as the second instant.

Still referring to FIG. 2, at block 30, a resource allocation schedule for power grid resources operating within the power grid is generated if the generated difference is smaller than a pre-determined threshold, the resource allocation schedule corresponding to a convergence path associated with the value of the upper bounds, the resource allocation schedule being configured to be received at the power grid resources. The power grid resources may include power plants in the power grid, and may further include various controllable and non-controllable loads within the power grid, such as rechargeable energy storage systems and devices.

In some embodiments, generating the resource allocation schedule further comprises: in response to determining that the generated difference is larger than the pre-determined threshold, generating a second difference between a value of second upper bounds from the plurality of obtained convergence paths and a value of second lower bounds from the plurality of obtained convergence paths, wherein, at a fourth instant, each of the plurality of convergence paths comprises a second upper bound, wherein, at a fifth instant, each of the plurality of convergence paths comprises a second lower bound, and wherein, at a sixth instant, each of the plurality of convergence paths comprises a second intermediate resource allocation schedule, wherein the fourth instant, the fifth instant, and the sixth instant are after a latest of the first instant, the second instant, and the third instant; and generating the resource allocation schedule if the second difference is smaller than the pre-determined threshold, the resource allocation schedule corresponding to the second intermediate response allocation schedule of a convergence path associated with the value of the second upper bounds. In some embodiments, the method further comprises transmitting, by the power management system, the resource allocation schedule to the power grid resources.

Figure 3:
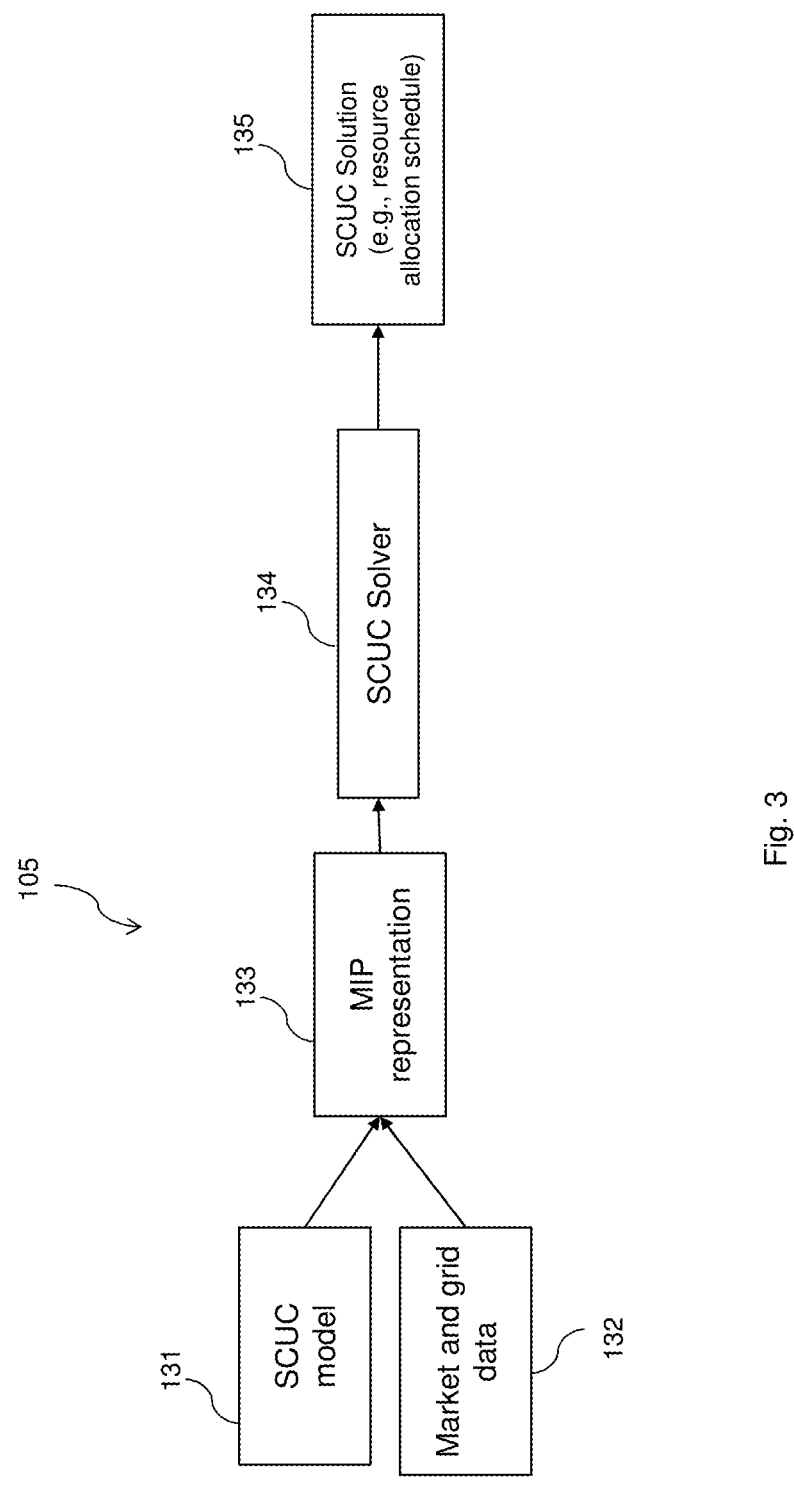
FIG. 3 is a function block diagram of a power management system (PMS), in some embodiments.

FIG. 3 is a function block diagram of a power management system (PMS) 105, in an embodiment. The PMS 105 in FIG. 3 may be used in the power management system 105 of FIG. 1, as an example. For simplicity, not all functional blocks of the PMS 105 are illustrated in FIG. 3.

The processing blocks 10-30 of FIG. 2 are implemented by the PMS 105, in accordance with some embodiments. As illustrated in FIG. 3, the PMS 105 formulates the SCUC problem as an MIP representation 133 by using an SCUC model 131 and applying market and grid data 132 to the SCUC model 131. Therefore, the MIP representation 133 is a mathematical model (e.g., 131) with constraints, in some embodiments. The processing of generating the MIP representation 133 corresponds to the processing in block 10 of FIG. 2, in some embodiments. Details of the SCUC model and formulating the MIP representation 133 are described below.

The PMS 105 further includes an SCUC Solver 134, which is configured to generate an SCUC Solution 135 (e.g., a resource allocation schedule). In some embodiments, the SCUC Solver 134 is configured to implement the blocks 20 and 30 of FIG. 2 and is described below in further detail.

In an embodiment, the SCUC model 131 for the security constrained unit commitment system is formulated as the following optimization problem:

$$\min_x \sum_{i=1}^{N} c_i^T x_i \tag{1}$$

subject to the following constraints: $A_{i,i}x_i \geq b_i$, i=1, 2, . . . , N, and $$\sum_{i=1}^{N} A_{c,i}x_i \geq b_c,$$

where N is the number of power grid resources (e.g., number of power plants and loads in the power grid), i is the resource index, $x_i$ is the decision vector for resource i, $c_i$ is the cost coefficient vector for resource i, $A_{i,i}$ is the constraint matrix for resource i, and $A_{C,i}$ is the coupling constraint matrix for resource i. Therefore, in the illustrated embodiment, solving the security constrained unit commitment system is equivalent to finding the decision vectors $x_i$, i=1, 2, . . . , N, that minimize the loss function (or cost function) shown in Equation (1) while satisfying the various constraints, where the decision vector $x_i$ is (or includes information for) the resource allocation schedule for, e.g., the i-th power grid resource. Note that in Equation (1), a vector x is used to denote all of the decision vectors $x_i$, i=1, 2, . . . , N.

The various constraints of the power grid 100 (e.g., Market and grid data 132) discussed above may be included in the constraint matrix $A_{i,i}$ and/or the coupling constraint matrix $A_{C,i}$, in some embodiments. The cost coefficient vector $c_i$ may include information such as cost information of the energy production. In various embodiments, the security constrained unit commitment system is a large-scale, mixed integer, linear, non-convex optimization problem. The security constrained unit commitment system is NP hard (Non-deterministic Polynomial-time hardness) and scales poorly with parallel MIP solvers using conventional methods. In the discussion herein, the security constrained unit commitment system (or problem) may also be referred to as a power grid resource allocation function, or a power grid resource allocation profile.

Referring to FIG. 3, the security constrained unit commitment (SCUC) system of Equation (1) with the system constraints may be represented as a mixed integer programming (MIP) representation 133. An SCUC solver 134 may be used to solve (e.g., finding the solution of) the security constrained unit commitment system. In an example embodiment, the SCUC solver 134 is a parallel asynchronous collaborative primal dual solver (PACPDS) 600 illustrated in FIG. 7. The SCUC solver 134, after solving the SCUC system, provides an SCUC solution 135, such as a resource allocation schedule for the power grid.

Referring to FIG. 7, the PACPDS 600 includes a plurality of primal solver instances 609 (may also be referred to as primal solvers) and a plurality of dual solver instances 607 (may also be referred to as dual solvers). Each of the primal solvers 609 is an MIP solver (e.g., a commercial available MIP solver) for solving the SCUC system of Equation (1) with the system constraints, and each of the dual solvers 607 is a solver for solving a dual optimization problem (e.g., a relaxed SCUC MIP problem) using relaxation techniques such as Lagrangian relaxation. In some embodiments, the PACPDS 600 obtains upper bounds from the plurality of primal solver instances 609 with different initial condition configurations (e.g., MIP solver parameter settings, MIP starts, etc.). In some embodiments, the PACPDS 600 obtains lower bounds from the dual solver instances 607. In addition, the PACPDS 600 may obtain lower bounds from the primal solver instances 609, e.g., by solving the SCUC system with integer relaxation of the SCUC system, which is done within the MIP solver. Furthermore, the PACPDS 600 may obtain upper bounds from the dual solver instances

607. In some embodiments, the PACPDS 600 uses the best upper bounds and the best lower bounds from a plurality of asynchronously running processes to determine if a primal feasible solution (which may be generated by the primal solver instance 609 or the Lagrangian dual solver instance 607 corresponding to the best upper bound) has met the solution gap target. Details of the PACPDS 600 are discussed hereinafter with reference to FIGS. 5-8.

Discussion of an MIP solver and its convergence behavior is provided below first, before discussion of the more complex PACPDS 600. In some embodiments, each of the primal solvers 609 in the PACPDS 600 of FIG. 7 is an MIP solver discussed here.

The MIP solver may be a software package running on a computer for solving an MIP problem (e.g., the security constrained unit commitment system). A commercially available general purpose MIP solver, such as CPLEX, or Gurobi, may be used to solve the security constrained unit commitment system. Open source MIP solvers such as CBC may also be used as the MIP solver.

Typically, an MIP solver, through a series of branch-and-bound (B&B) operations and/or a series of branch-and-cut (B&C) operations, searches through the vector space of the decision vectors to find integer feasible solutions with lower and lower upper bounds, thereby gradually approach the optimum solution (e.g., a set of decision vectors $x_i$ that correspond to a minimum loss function for the security constrained unit commitment system). The initial condition may also be referred to as an initial condition configuration. The MIP solver computes and updates, in multiple iterations/steps, the values for the decision vectors such that the loss function decreases as time goes by, until the MIP solver reaches a final solution, which is the optimum solution of the security constrained unit commitment system or is close enough to the optimum solution. For example, the MIP solver may find feasible solutions which correspond to upper bounds (UBs) of the SCUC problem, and may find solutions to integer relaxed SCUC problem which correspond to lower bounds (LBs) of the SCUC problem. When a difference between the UB and the LB is within a per-determined gap target, the SCUC problem is considered to be solved (e.g., the MIP solver is considered to have converged to the optimum solution). The path (e.g., vector space traversed by the MIP solver) from the initial condition to the final solution is said to be a convergence path of the MIP solver (or of the SCUC system), and the MIP solver is said to converge to the final solution along this convergence path. Note that different initial conditions (which may include any solver parameters, and/or initial guess(es) of the SCUC solution (also referred to as MIP starts) that affect the convergence behavior of the MIP solver) generally result in different convergence paths for an MIP solver. The decision vectors $x_i$ provided by the MIP solver at a particular time instant (e.g., at time $T_0$ after a particular iteration) along the convergence path is considered a (temporary or tentative) solution at the particular time instant (e.g., at time $T_0$).

Figure 4:
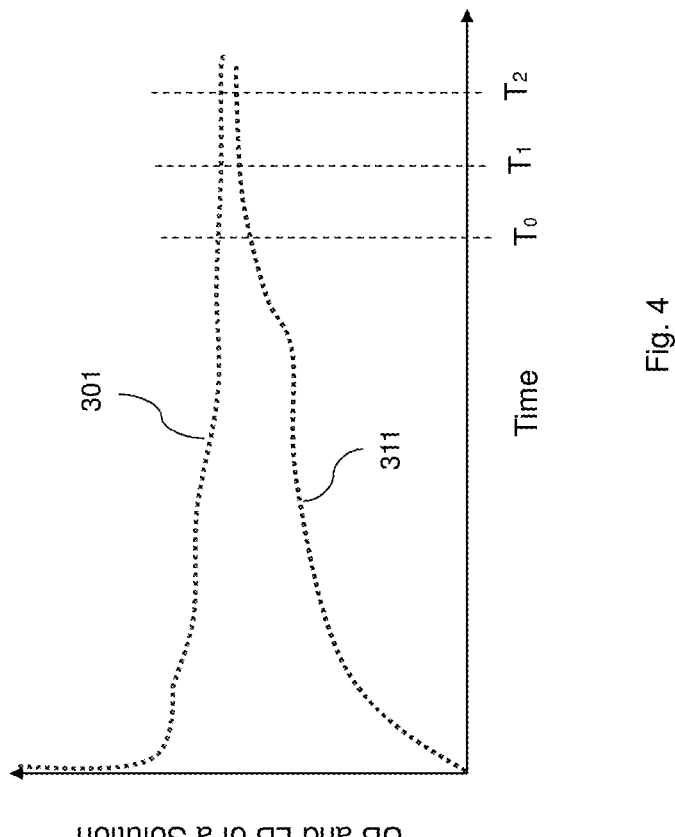
FIG. 4 illustrates the convergence behavior of an upper bound and a lower bound of a security constrained unit commitment (SCUC) system along a convergence path of a solution to the SCUC problem, in an embodiment.

FIG. 4 illustrates the upper bound and the lower bound trajectories of a convergence path of an MIP solver for a security constrained unit commitment system, in an embodiment. In FIG. 4, the x-axis represents time (e.g., computation time), and the y-axis represents the value of the loss function (see, e.g., Equation (1)) of the security constrained unit commitment system, where the value of the loss function may be computed by plugging the current decision vectors $x_i$ into the loss function of Equation (1). In the example of FIG. 4, two curves (e.g., 301, 311) from a single convergence path are shown as an illustration.

Referring to FIG. 4, the upper bound curve 301 illustrates the upper bound of the convergence path, and the lower bound curve 311 illustrates the lower bound of the convergence path. The upper bound at a particular time instant shows the value of the loss function for the current solution (e.g., current values for the decision vectors $x_i$) or the most recent solution to the SCUC system provided by the MIP solver. Note that the solution to the SCUC system (e.g., the decision vectors $x_i$) provided by the MIP solver is a mix-integer solution, which include integers (e.g., logic values of 0 or 1 to indicate turning on or off a power plant). In contrast, the lower bound curve 311 in FIG. 4 corresponds to the value of the loss function for an integer relaxed solution to the security constrained unit commitment system. In the integer relaxed solution, instead of restricting (at least some of) the variables in the decision vectors $x_i$ to be integers, the variables in the decision vectors $x_i$ of an integer relaxed solution are allowed to be real numbers (e.g., continuous values). The integer relaxed solution may also be referred to as a solution to an integer relaxed security constrained unit commitment system.

In some embodiments, besides providing a solution to the security constrained unit commitment system, the MIP solver also provides an integer relaxed solution to the security constrained unit commitment system in parallel. As a result of the increased vector space to search for the integer relaxed solution, the loss function associated with an integer relaxed solution (which corresponds to the lower bound) is lower than or equal to the corresponding loss function associated with the solution to the original security constrained unit commitment system (which is the upper bound). Therefore, as illustrated in FIG. 4, the lower bound curve 311 is below the upper bound curve 301. In addition, as the MIP solver converges toward the final solution (e.g., the optimum solution), the upper bound curve 301 decreases, the lower bound curve 311 increases, and the difference between the upper bound curve 301 and the lower bound curve 311 decreases.

In some embodiments, at a time instant (e.g., time $T_0$), the difference (also referred to as a gap) between the upper bound and the lower bound is computed and compared with a pre-determined threshold (e.g., a gap target, or a target gap value). If the computed difference is smaller than the pre-determined threshold, the MIP solver is considered to have converged to the final solution (e.g., optimum solution), and the MIP solver is stopped. The solution of the (stopped) MIP solver then provides the solution to the security constrained unit commitment system, in some embodiments. The decision vectors $x_i$ of the final solution include information regarding the operation schedule of the power grid resources (e.g., power plants) of the power grid, which information can be extracted from the decision vectors $x_i$ to form the resource allocation schedule for the power grid. Before convergence of the MIP solver is detected or declared, the operation schedule formed using information from the (temporary) decision vectors $x_i$ may be referred to as a temporary or intermediate resource allocation schedule.

The example described above for detecting convergence and for stopping the MIP solver checks the difference between the upper bound and the lower bound at a same time instant (e.g., time $T_0$). This is simply a non-limiting example. In other embodiments, the values of the upper bound and the lower bound at two different, but close (e.g., within a few seconds, or a few minutes) time instants may be used to determine if the MIP solver have converged. For example, the difference between the upper bound at time instant $T_1$ and the lower bound at time instant $T_2$ may be compared with the pre-determined threshold, and if the difference is smaller than the pre-determined threshold, then a solution to the security constrained unit commitment system provided by the MIP solver at a time instant T between time instants $T_1$ and $T_2$ (e.g., $T_1 \leq T \leq T_2$) may be used as the final solution to provide the resource allocation schedule. As another example, the difference between the upper bound at time instant $T_2$ and the lower bound at time instant $T_1$ may be compared with the pre-determined threshold, and if the difference is smaller than the pre-determined threshold, then a solution to the security constrained unit commitment system provided by the MIP solver at a time instant $T_2$ may be used as the final solution to provide the resource allocation schedule.

Due to factors such as the large dimension of each of the decision vectors $x_i$, the large number of decision vectors, and the non-convex nature of the security constrained unit commitment system, using a single MIP solver to solve the security constrained unit commitment system may take a very long time to achieve/detect convergence. For example, in some cases, the upper bound curve 301 may have already be close enough (with respect to the gap tolerance) to the optimum solution (e.g., the upper bound curve 301 now decreases very slowly or remains unchanged), but the lower bound curve 311 has not converged and is still increasing. It may take a long time for the lower bound curve 311 to rise close enough to the upper bound curve 301 (e.g., closer than the pre-determined target gap). Therefore, although the MIP solver may have already found an acceptable solution, detection of convergence may take a much longer time since the MIP solver does not know that the solution is acceptable. As another example, depending on the initial condition used to start the MIP solver, the convergence path of the MIP solver may be short or long. Some initial conditions may results in a very long time for the MIP solver to converge to the final solution.

To reduce the convergence time, the present disclosure uses a plurality of MIP solvers to solve the security constrained unit commitment system in parallel. Each of the plurality of MIP solvers (see, e.g., primal solvers 609 in FIG. 7) is executed with a different solver configuration, such that each MIP solver follows a different convergence path to the final solution (e.g., the optimum solution). In other words, each of the MIP solvers solves the same security constrained unit commitment system, but follows a different convergence path, e.g., due to different solver configurations and MIP starts. Here the initial conditions include any suitable parameter settings (time allocation, solution strategy, MIP starts, etc.) that perturb the solution behavior of the solver, such that a different convergence path is obtained for each initial condition. For example, besides setting different initial values for the decision vectors $x_i$, other ways to set different initial conditions may include setting different emphasis strategies for the MIP solvers 134, setting different time allocations (e.g., the longest computation time allowed) for the MIP solvers 134, and/or setting different gap targets.

FIG. 5 illustrates the processing in blocks 20 and 30 of FIG. 2 in more detail. For example, FIG. 5 illustrates the obtained convergence paths described in blocks 20 and 30 in FIG. 2. As will be discussed in more detail hereinafter with reference to FIG. 5, a minimum value of the upper bounds of a plurality of MIP solvers is determined, and a maximum value of the lower bounds of the plurality of MIP solvers is determined. The difference between the minimum value of the upper bounds and the maximum value of the lower bounds are computed and compared with a pre-determined threshold to detect convergence of the security constrained unit commitment system solution.

Referring now to FIG. 5, which illustrates a plurality of upper bound curves and a plurality of lower bound curves of a security constrained unit commitment system along a plurality of convergence paths, in an embodiment. For simplicity, FIG. 5 shows, among other curves, two upper bound curves 401 and 403, and two lower bound curves 411 and 413. Each of the upper bound curves 401/403 is generated by an MIP solver (e.g., a primal solver 609 in FIG. 7) along its convergence path, and the MIP solver may also generate a respective lower bound curve (e.g., 411 or 413). Therefore, the lower bound curves 411/413 and the upper bound curves 401/403 in FIG. 5 may be generated by two MIP solvers initialized with different initial conditions (thus following two different convergence paths). Although two sets of lower bound curves and upper bound curves are illustrated in FIG. 5, other numbers of lower bound curves/ upper bound curves and other numbers of MIP solvers may be used, as one skilled in the art readily appreciates.

In some embodiments, to detect convergence of the solution to the security constrained unit commitment system and to stop the MIP solvers at a time instant (e.g., $T_0$), a minimum value UB of the upper bounds at the time instant (e.g., $T_0$) from the upper bound curves (e.g., 401, 403) are generated by UB=min(UB$_1$, UB$_2$, . . . , UB$_N$), and a maximum value of the lower bounds from the lower bound curves (e.g., 411, 413) at the time instant (e.g., $T_0$) are generated by LB=max(LB$_1$, LB$_2$, . . . , LB$_M$), where UB$_i$, i=1, 2, . . . , N, is the i-th upper bound, N is the number of upper bound curves, LB$_k$, k=1, 2, . . . , M, is the k-th lower bound, and M is the number of lower bound curves, where M may or may not be equal to N, depending on, e.g., how the lower bound curves are generated. The difference between the minimum value UB of the upper bounds (or a lowest of the upper bounds) and the maximum value LB of the lower bounds (or a highest of the lower bounds) are compared with a pre-determined threshold (e.g., a target gap value between upper bound and lower bound). If the difference is smaller than the pre-determined threshold, convergence of the solution to the security constrained unit commitment system is detected, and the MIP solvers may be stopped. The solution (e.g., decision vectors $x_i$) of the convergence path having the lowest upper bound value is then used as the final solution, and the resource allocation schedule of the power grid is obtained (e.g., extracted) from the final solution. On the other hand, if the difference between the minimum value UB of the upper bounds and the maximum value LB of the lower bounds are larger than the pre-determined threshold, the MIP solvers continues to search for better solutions, until convergence is detected (or until the allowed computation time expires).

The above discussion regarding detecting convergence uses upper bound values and lower bound values at a same instant, which is merely a non-limiting example. Similar to the discussion above with reference to FIG. 4, convergence may be detected using the minimum value UB of the upper bounds and the maximum value LB of the lower bounds generated at two different time instants (e.g., $T_1$ and $T_2$), where the min( ) and max( ) functions are taken at the two different time instants using upper bound values and lower bound values at the corresponding time instants. One of ordinary skill, upon reading the discussion above with reference to FIG. 4, would be able to readily apply the principle discussed above with reference to FIG. 4 for the discussion here with referenced to FIG. 5. For simplicity, details are not repeated here.

In FIG. 5, since a plurality of MIP solvers are used to solve the security constrained unit commitment system (with each MIP solver generating one of the upper bound curves such as 401 or 403), the likelihood that at least one of the MIP solvers follows a faster convergence path (e.g., convergences quickly) is greatly increased. As a result, the likelihood that at least one of the solutions (provided by the MIP solver with faster convergence path) convergences to the optimum solution quickly is also greatly increased. In other words, through parallelization (e.g., use of multiple MIP solvers to solve the same security constrained unit commitment system with different initial conditions), the time needed to achieve the final solution (e.g., optimum solution) is significantly reduced. In addition, by using the minimum value UB of the upper bounds and the maximum value LB of the lower bounds for detecting convergence, the time needed to detect convergence of the solution is also reduced.

FIG. 5 further illustrates a lower bound curve 415, which illustrates another lower bound of the loss function of the security constrained unit commitment system. The lower bound curve 415 is generated by solving a dual optimization problem of the security constrained unit commitment system, where the dual optimization problem (also referred to as a dual problem) is a relaxed SCUC problem using relaxation techniques such as Lagrangian Relaxation (LR). For example, the dual problem of (e.g., LR of) the security constrained unit commitment system of Equation (1) may be formulated as:

$$\phi(\lambda) = \min_{x} \sum_{i=1}^{N} c_i^T x_i + \lambda^T \left( b_c - \sum_{i=1}^{N} A_{c,i} x_i \right) \quad (2.1)$$

$$= \lambda^T b_c + \sum_{i=1}^{N} \min_{x_i} (c_i^T - \lambda^T A_{c,i}) x_i \quad (2.2)$$

subject to the following constraints: $A_{i,i} x_i \geq b_i$, i=1, 2, . . . , N. Note that by rewriting the dual problem in (2.1) into (2.2), the dual problem of Equation (2.1) is decomposed into a plurality of dual sub-problems:

$$\min_{x_i} (c_i^T - \lambda^T A_{c,i}) x_i \quad (3)$$

subject to the following constraint: $A_{i,i} x_i \geq b_i$. As will be discussed below with reference to FIG. 6, an iterative algorithm may be used by an LR dual optimizer (also referred to as an LR dual solver, or dual solver) to solve the dual problem in Equation (2.2), and the plurality of dual sub-problems in Equation (3) may be solved in parallel by a plurality of LR sub-problem optimizers (also referred to as LR sub-problem solvers) to reduce the computation time needed to approach the final solution (e.g., the optimum solution) of the dual problem. In other words, each of the LR sub-problem optimizer (an MIP solver in an example embodiment) solves one or more (and different) LR sub-problems.

In the illustrated embodiment of FIG. 5, the LR dual solver generally finds tighter lower bounds faster than the MIP solvers. Therefore, during detection of convergence of the solution to the security constrained unit commitment system, the lower bound value indicated by the lower bound curve 415 may be used in addition to, or in place of, the lower bounds indicated by the lower bound curves 411/413 in determining the maximum value LB of the lower bounds.

In other words, the lower bound provided by the LR dual solver significantly reduces the time needed for detection of the convergence of the solution to the security constrained unit commitment system.

FIG. 5 further illustrates an upper bound curve 405 generated by the LR dual solver. In the illustrated example of FIG. 5, the upper bound curve 405 is not a tight upper bound at the beginning portion of the upper bound curve 405, but provides a tighter upper bound as the LR dual solver converges (e.g., after some iterations). Therefore, the upper bound provided by the LR dual solver may also be used (e.g., in addition to the upper bounds provided by the MIP solvers) in determining the minimum value UB of the upper bounds.

Note that FIG. 5 only illustrates one lower bound curve 415 and one upper bound curve 405 derived from an LR dual solver as a non-limiting example. In some embodiments, a plurality of LR dual solvers, each initialized with a different initial condition and algorithm variations for determining update to LR multipliers, are used to solve the dual problem along different convergence paths, thereby providing a plurality of lower bound curves similar to the lower bound curve 415, and the lower bounds indicated by these lower bound curves are used to find the maximum value LB of lower bounds for detecting convergence of the security constrained unit commitment solution. Similarly, the upper bound curves provided by the plurality of LR dual solvers, similar to the upper bound curve 405, may also be used to find the minimum value UB of the upper bounds for detecting convergence of the security constrained unit commitment solution.

FIG. 6 illustrates a flow chart for a method 500 of solving the dual problem in Equation (2.2), which is a Lagrangian Relaxation (LR) of the security constrained unit commitment system of Equation (1), in an embodiment.

Referring to FIG. 6, at block 501, the Lagrangian multiplier vector $\lambda$ is initialized. In block 503, the objective coefficient of the plurality of dual sub-problems are updated according to Equation (3) and the LR dual sub-problems are solved. A corresponding lower bound of the SCUC system is calculated. Note that a plurality of LR sub-problem solvers may be used to solve the plurality of dual sub-problems in parallel. In block 505, a sub-gradient is calculated using the current solution. In block 507, a correction value is calculated for the Lagrangian multiplier vector A using the calculated sub-gradient. In block 509, the algorithm checks if the current solution satisfies the coupling constraints and calculates a corresponding upper bound for the SCUC system using the current solution. Note that if the current solution does not satisfy all the coupling constraints, the upper bound calculated may be a loose upper bound (either an UB of positive infinity or a finite UB depending on the magnitude of the slack variables needed to make the infeasible coupling constraints feasible, and the penalty cost used for the slack variables.) In block 511, the LR optimizer checks if convergence has been achieved for the dual problem. If not, in block 515, the Lagrangian multiplier vector $\lambda$ is updated with the calculated correction value, and processing goes back to block 503 for another iteration. If convergence of the dual problem is achieved, processing proceeds to block 513, wherein the algorithm checks if the current solution to the dual problem is a feasible solution to the SCUC problem (e.g., satisfies the coupling constraints). If the current solution is infeasible, an infeasibility correction step is performed to modify the current solution, such that the modified solution satisfies the coupling constraints. An upper bound (e.g., a tight upper bound) is calculated using the modified solution. Note that the final solution provided by the LR dual solver (e.g., after the infeasibility correction step or after being confirmed as a feasible solution) is also a valid solution for the SCUC system, and may be referred to as a primal feasible solution.

FIG. 7 illustrates a block diagram of the parallel asynchronous collaborative primal dual solver (PACPDS) 600 for solving the security constrained unit commitment system, in an embodiment. The PACPDS 600 may be used, e.g., as the SCUC solver 134 of FIG. 3 for implementing the processing block 20 and (at least portions of) the processing block 30 in FIG. 2.

Referring to FIG. 7, the PACPDS 600 includes a plurality of primal solver instances 609 (e.g., MIP solvers such as commercially available MIP solvers) for solving the security constrained unit commitment system (see, e.g., Equation (1)). The plurality of primal solvers 609 are executed with different solver parameter configurations and optionally MIP starts, such that each of the primal solvers 609 follows a different convergence path and provides a different upper bound curve (see, e.g., upper bound curve 401/403 in FIG. 5). The PACPDS 600 also includes a plurality of dual solver instances 607 (e.g., LR dual solvers) for solving the dual problem (see, e.g., Equation (2.2)) of the security constrained unit commitment system. Each of the dual solvers 607 may include a plurality of LR sub-problem optimizers to solve in parallel the plurality of LR sub-problems (see, e.g., Equation (3)). Each of the dual solvers 607 provides a different lower bound curve (see, e.g., lower bound curve 415 in FIG. 5). In other words, each of the dual solvers 607 finds the final solution along a different convergence path.

In some embodiments, the solution found by a dual solver 607 provides a near feasible solution for the primal solver 609, and may be used to warm start a new instance of primal solver 609 (see label "MIP start" in FIG. 7). For example, the solution found by a dual solver 607 may be used as an initial guess of the solution to the SCUC problem to start a new instance of primal solver 609, which new instance of primal solver 609 may achieve faster convergence.

Still referring to FIG. 7, the PACPDS 600 includes an upper bound (UB) server 605 and a lower bound (LB) server 603. The UB server 605 and the LB server 603 manage publications and subscriptions to the LB and UB. For example, the UB server 605 collects the upper bounds from the plurality of primal solvers, finds the minimum value UB of the upper bounds, and publishes the minimum value UB of the upper bounds as the "best upper bound (BUB)." Similarly, the LB server 603 collects the lower bounds from, e.g., the plurality of dual solvers 607, finds the maximum value LB of the lower bounds, and publishes the maximum value LB of the lower bounds as the "best lower bound (BLB)."

The BLB and BUB are sent to a Solution Supervisor 601 of the PACPDS 600. The Solution Supervisor 601 monitors the BLB and BUB, and determines whether convergence of the SCUC solution has been reached. For example, if the difference between the BUB and BLB is smaller than a pre-determined threshold (e.g., the gap target), the Solution Supervisor 601 declares that convergence has been achieved, and stops the primal solvers 609 and the dual solvers 607. The resource allocation schedule of the power grid 100 is then obtained from the solution of the security constrained unit commitment system (e.g., provided by a primal solver 609) that has the lowest upper bound value. Besides determining the termination of (e.g. stopping) the primal solvers 609 and the dual solvers 607, the Solution Supervisor 601 has other functionalities, such as instantiating instances of the primal solvers 609 and the dual solvers 607, setting the initial conditions and starting the primal solvers 609 and the dual solvers 607.

FIG. 7 further illustrates a data path between the LB server 603 and the primal solvers 609. In some embodiments, the BLB provided by the LB server 603 is sent to the primal solvers 609 and compared with the upper bounds provided by the primal solvers 609 to detect convergence of the solution to the security constrained unit commitment system. In other words, it is possible to detect convergence directly without the involvement of the Solution Supervisor 601. Similarly, the BUB provided by the UB server 605 may be sent to the dual solvers 607 to detect convergence directly without the involvement of the Solution Supervisor 601.

Figure 8:
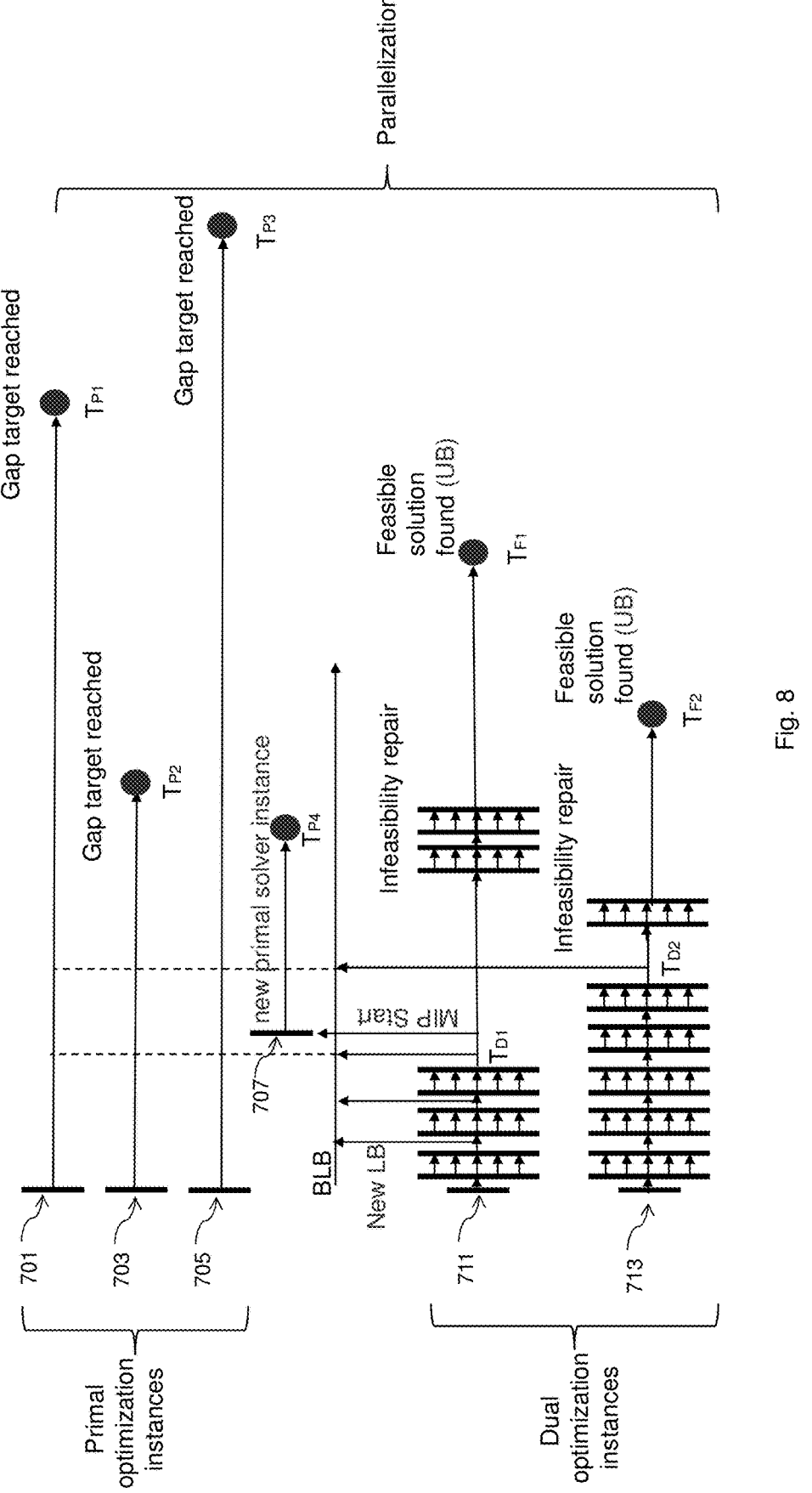
FIG. 8 illustrates the interaction of the parallel independent processes in the parallel asynchronous collaborative primal dual solver of FIG. 7, in some embodiments.

FIG. 8 illustrates the interaction of the parallel independent processes in the parallel asynchronous collaborative primal dual solver 600 of FIG. 7, in some embodiments. FIG. 8 illustrates, for example, the obtained convergence paths and the generated difference described in blocks 20 and 30 of FIG. 2.

In the example of FIG. 8, three primal solvers 701/703/705 (e.g., MIP solvers) are instantiated to solve the security constrained unit commitment system in parallel along different convergence paths. The horizontal line corresponding to each instance of the primal solvers 701/703/705 represents the computation time. If left alone, each of the primal solvers 701/703/705 will run through its own course until the solution convergences to the optimum solution at time $T_{P1}$, $T_{P2}$, and $T_{P3}$, respectively, as illustrated by the dots labeled as "Gap target reaches" at the end of each line.

FIG. 8 further illustrates two dual solvers 711/713 being instantiated to solve the dual problem of the security constrained unit commitment system along different convergence paths. Processing of each dual solver includes finding a solution to the dual problem (see, e.g., processing blocks between blocks 501 and 511 in FIG. 6), and performing an additional step of infeasibility repair (see, e.g., block 513 in FIG. 6) if the solution found does not satisfy the constraints of the dual problem. In the example of FIG. 8, the dual solver 711 performed three iterations to find a solution at time $T_{D1}$, where each iteration is illustrated as a ladder shape with two vertical lines and a plurality of rungs (e.g., arrows) in between. The rungs (or arrows) of the ladder shape indicates the number of parallel LR sub-problem solvers instantiated. Therefore, in the example of FIG. 8, the dual solver 711 has five LR sub-problem optimizers and runs three iterations to converge to a solution at time instant $T_{D1}$, and the dual solver 713 has five LR sub-problem optimizers and runs five iterations to converge to a solution at time instant $T_{D2}$. Note that the solutions at time instants $T_{D1}$ and $T_{D2}$ may not be feasible solutions (e.g., do not satisfy all the constraints of the LR dual problem) but corresponds to very tight lower bounds of the SCUC system. After the infeasibility repair (see block 513 in FIG. 6), a primal feasible solution (e.g., a solution for the SCUC system) is achieved by each of the dual solvers 711/713 at time $T_{F1}$ and $T_{F2}$, respectively.

As illustrated in FIG. 8, the dual solvers 711 provides a lower bound value of the SCUC system to the UB server 605 (see FIG. 7) after each iteration (see the arrows labeled "New LB" after each iteration) and before the infeasibility repair, which lower bound value is used by the UB server 605 to find the "best lower bound" (BLB) (the maximum value of all the currently reported lower bounds). Similarly, the dual solver 713 also provides a lower bound value after each iteration to the UB server 605. To avoid clutter, FIG. 8 only illustrates one submission of the lower bound value from the dual solver 713 to the UB server at time $T_{D2}$, with the understanding that the lower bound value after each iteration of the dual solver 713 may be sent to the UB server 605 for finding the BLB. The "best lower bound" BLB is then compared with the upper bounds of all the primal solvers (e.g., 701, 703, and 705) to detect convergence. Note that comparing the BLB with the upper bounds of all the solvers to detect convergence is equivalent to comparing the BLB with the "best upper bound" (BUB) to detect convergence, where the BUB is the minimum value of all of the currently reported upper bounds. If the difference between the BLB and BUB (or between BLB and any of the upper bounds) is smaller than a pre-determined threshold (e.g., the gap target), it is decided that the solution of the primal solver with the lowest upper bound value has converged to the final solution (e.g., the optimum solution) of the security constrained unit commitment system, and the primal solvers and the LR dual optimizers are stopped.

FIG. 8 further illustrates an MIP start of a primal solver 707. For example, at time $T_{D1}$, the dual solver 711 reached a near feasible solution, the near feasible solution is used to set the initial conditions of a new instance of primal solver 707. In the example of FIG. 8, the new instance of the primal solver 707 converges to an optimum solution of the SCUC system at time $T_{P4}$, which may be and often is earlier than the convergence time $T_{P1}$, $T_{P2}$, $T_{P3}$ of other primal solvers.

As discussed above, convergence of the solution to the security constrained unit commitment system may be detected or declared at various stages of processing of the primal solvers and/or the dual solvers. For example, after a primal solver 609 reaches the gap target (e.g., at time $T_{P1}$, $T_{P2}$, $T_{P3}$, or $T_{P4}$), convergence may be declared. As another example, after a dual solver 607 finds a feasible solution (e.g., at time $T_{F1}$ or $T_{F2}$), the feasible solution found by the dual optimizer may be used as a solution to the SCUC system. As yet another example, after each dual solver 607 finds a (temporary) solution after each iteration but before the infeasibility repair, the lower bound provided by the dual solver 607 at this stage may be used to find the BLB, and the BLB is compared with the BUB for detecting convergence. Convergence of the solution to the security constrained unit commitment system is detected/declared at an earliest time possible, e.g., when any of the above described stages is reached.

As illustrated in FIG. 8, multiple levels of parallel processing are used to reduce the convergence time. For example, multiple primal solvers 609 are used to solve the security constrained unit commitment system in parallel, and multiple dual solvers 607 are used to solve the LR dual problem in parallel. In addition, for each of the dual solvers 607, multiple LR sub-problem optimizers are used to solve the plurality of LR sub-problems in parallel.

Figure 9B:
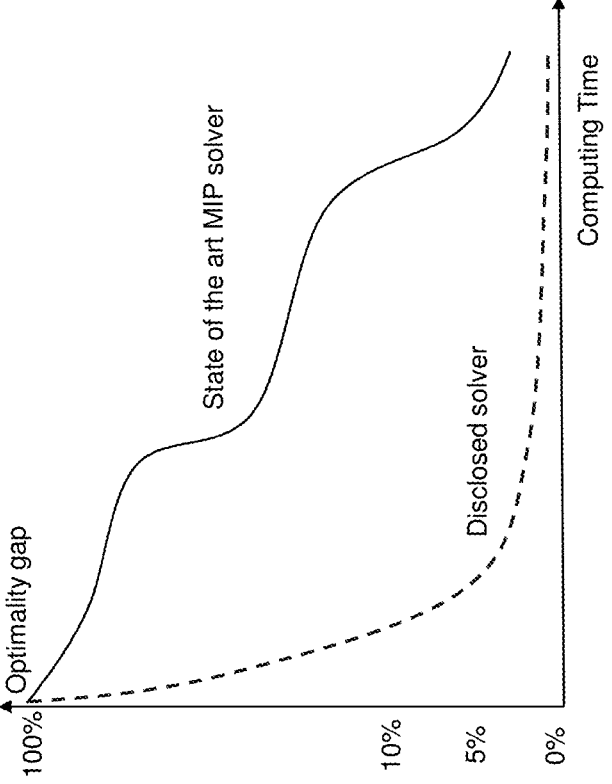
FIGS. 9A and 9B illustrate the performance of the parallel asynchronous collaborative primal dual solver of FIG. 7, in some embodiments.
Figure 9A:
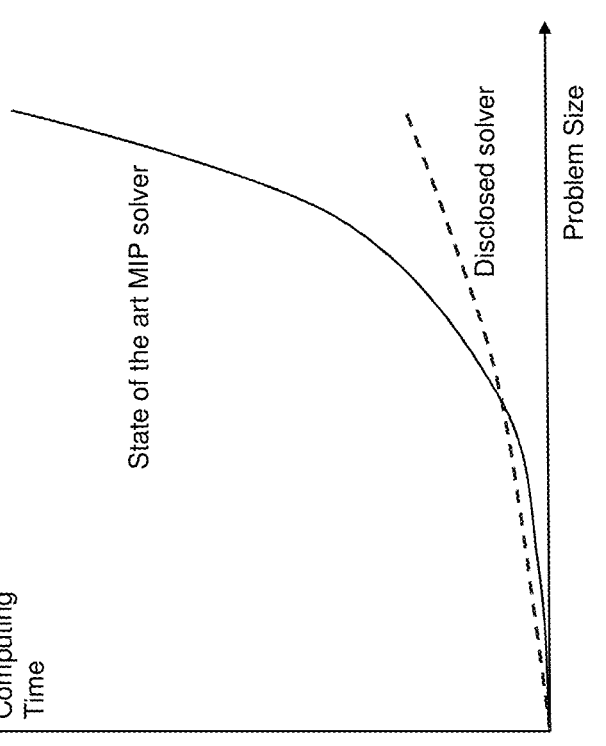

FIGS. 9A and 9B illustrate the performance of the parallel asynchronous collaborative primal dual solver 600 of FIG. 7, in some embodiments. As illustrated in FIG. 9A, the computational time (elapsed time) to solve the security constrained unit commitment system using conventional methods (e.g., solving the security constrained unit commitment system by running a single MIP solver until the gap target is reached) increases exponentially with the size of the security constrained unit commitment system (e.g., number of variables in the decision vectors). In comparison, the computational time for the disclosed embodiments increases at a much slower rate with the size of the security constrained unit commitment system. In addition, as illustrated in FIG. 9B, the gap (e.g., difference) between the upper bound and the lower bound (which is used for detecting convergence) decreases slowly over time for conventional methods. In contrast, using the disclosed parallel asynchronous collaborative primal dual solver 600, the gap between the upper bound and the lower bound decrease at faster rate, thereby resulting in faster convergence.

Figure 10:
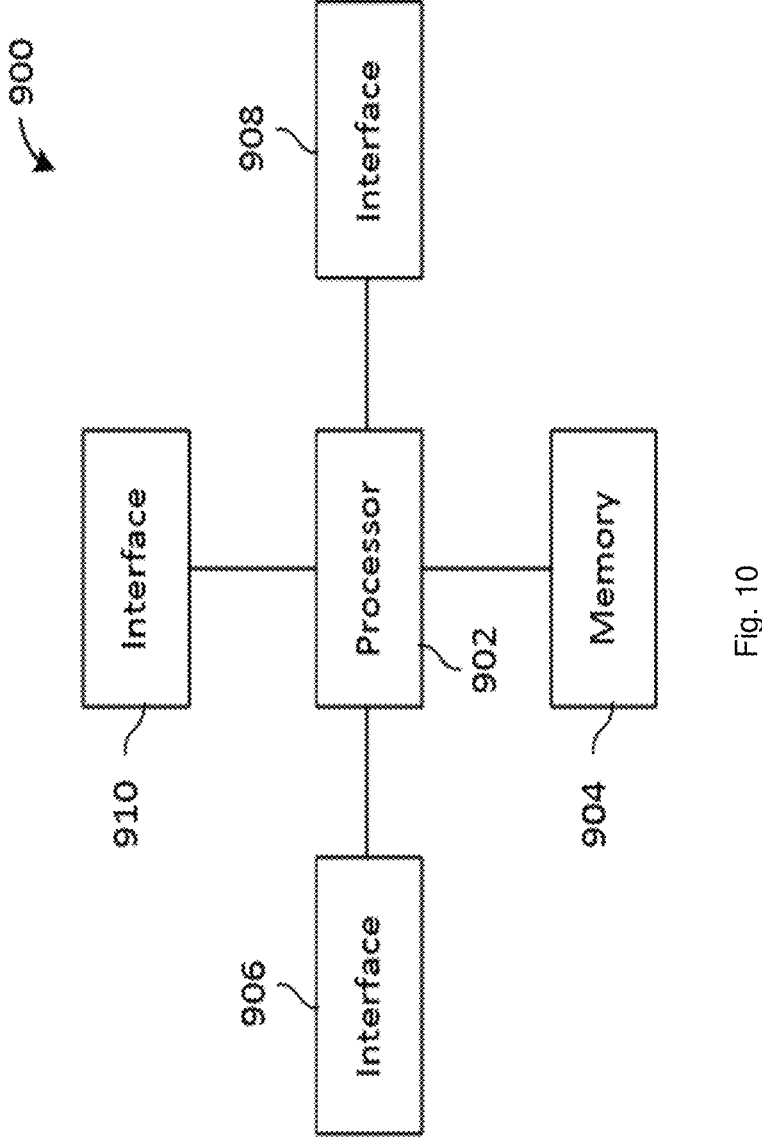
FIG. 10 is a block diagram of a processing system for performing the processing of the parallel asynchronous collaborative primal dual solver of FIG. 7, in some embodiments.

FIG. 10 is a block diagram of a processing system for performing the processing in accordance with various embodiments described above. For example, FIG. 10 may implement the PMS 105, which is used to perform the processing of FIG. 2.

As shown in FIG. 10, the processing system 900 includes a processor 902, a memory 904, and interfaces 906-910, which may (or may not) be arranged as shown in FIG. 10. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components. For example, one or more of the interfaces 906, 908, 910 may be adapted to communicate data, control, or management messages from the processor 902 to applications installed on a host device and/or a remote device. As another example, one or more of the interfaces 906, 908, 910 may be adapted to allow a device (e.g., personal computer (PC), etc.) to interact/communicate with the processing system 900. The processing system 900 may include additional components not depicted in FIG. 10, such as long-term storage (e.g., non-volatile memory, etc.).

Embodiments may achieve advantages. For example, by using multiple levels of parallelization (e.g., multiple primal solvers and multiple dual solvers, and each of the dual solvers having multiple LR sub-problem optimizers), and by initializing the primal solvers and dual solvers with different initial conditions, the parallel asynchronous collaborative primal dual solver (PACPDS) 600 achieves much faster convergence than conventional methods. Computational time of the disclosed PACPDS 600 grows at a much slower rate with the size of the security constrained unit commitment system. The asynchronous collaboration between the primal solvers 609 and the dual solvers 607 allows convergence of the solution to be checked at multiple stage of processing of the primal solvers and the dual solvers. In addition, the disclosed embodiments provide tolerance of failure of a particular solution path (e.g., the convergence path of a particular solver), due to the minimum value of the upper bounds and the maximum value of the lower bounds being used in detecting convergence. For example, a failed solution path may have a much higher upper bound value than other properly working solution paths, and therefore, would be "ignored" by the min( ) function used to find the minimum value of the upper bounds. Furthermore, the near feasible solution of the dual problem found by a dual solver 607 may be used to warm start (e.g., MIP start) a primal solver 609 to reduce convergence time.

Variations and modifications to the disclosed embodiments are possible and are fully intended to be included within the scope of the present disclosure. For example, in the discussion above, the best upper bound (BUB) is determined by taking the minimum value of the plurality of upper bounds. In alternative embodiments, the BUB is determined by taking, e.g., the second minimum value, or the third minimum value, etc., of the plurality of upper bounds. In fact, the BUB may be determined by arbitrarily taking an upper bound value from the plurality of upper bounds. Similarly, in the discussion above, the best lower bound (BLB) is determined by taking the maximum value of the plurality of lower bounds. In alternative embodiments, the BLB is determined by taking, e.g., the second maximum value, or the third maximum value, etc., of the plurality of lower bounds. In fact, the BLB may be determined by arbitrarily taking a lower bound value from the plurality of lower bounds. However, these modifications may not have all of the advantages of the embodiments discussed above. For example, the convergence time may not be as fast, or the tolerance of a failed solution path may not be as strong.

The present disclosure has been described in a specific context, namely to a power management system of a power grid that uses parallel asynchronous collaborative primal dual solution for solving the Security Constrained Unit Commitment (SCUC) problem of the power grid.

Example embodiments of the present disclosure are summarized here. Other embodiments can also be understood from the entirety of the specification and the claims filed herein.

Example 1. In an embodiment, a method of operating a power grid includes: generating, by a power management system of the power grid, a power grid resource allocation profile indicative of an operation of the power grid constrained by operational information of the power grid; generating a difference between a value of upper bounds from a plurality of obtained convergence paths and a value of lower bounds from the obtained convergence paths, the obtained convergence paths being based on a plurality of different initial conditions for the generated power grid resource allocation profile; and generating a resource allocation schedule for power grid resources operating within the power grid if the generated difference is smaller than a pre-determined threshold, the resource allocation schedule corresponding to a convergence path associated with the value of the upper bounds, the resource allocation schedule being configured to be received at the power grid resources.

Example 2. The method of Example 1, further comprising transmitting, by the power management system, the resource allocation schedule to the power grid resources.

Example 3. The method of Example 1, wherein the operational information comprises information for constraining operation of the power grid and comprises security-related transmission constraint information and cost information.

Example 4. The method of Example 1, wherein generating the power grid resource allocation profile comprises formulating the power grid resource allocation profile as a Security Constrained Unit Commitment system based on mixed integer programming.

Example 5. The method of Example 1, wherein, at a first instant, each of the plurality of obtained convergence paths comprises an upper bound, wherein, at a second instant, each of the plurality of obtained convergence paths comprises a lower bound, and wherein, at a third instant, each of the plurality of obtained convergence paths comprises an intermediate resource allocation schedule, wherein generating the resource allocation schedule comprises choosing the intermediate resource allocation schedule of the convergence path associated with the value of the upper bounds as the resource allocation schedule.

Example 6. The method of Example 5, wherein generating the difference comprises generating the difference between a minimum value of the upper bounds and a maximum value of the lower bounds.

Example 7. The method of Example 5, wherein the plurality of obtained convergence paths comprises first convergence paths obtained by solving the power grid resource allocation profile using a plurality of Mixed Integer Programming (MIP) solvers, wherein each of the plurality of MIP solvers is initialized with a different initial condition configuration such that each of the plurality of MIP solvers converges along a different convergence path.

Example 8. The method of Example 7, wherein each of the plurality of MIP solvers is configured to generate a mixed-integer solution to the power grid resource allocation profile at the first instant, wherein the mixed-integer solution has a corresponding upper bound for the power grid resource allocation profile.

Example 9. The method of Example 8, wherein each of the plurality of MIP solvers is further configured to generate an integer relaxed solution to the power grid resource allocation profile at the second instant, wherein the integer relaxed solution has a corresponding lower bound for the power grid resource allocation profile.

Example 10. The method of Example 9, wherein the plurality of obtained convergence paths comprises second convergence paths obtained by solving a second power grid resource allocation profile different from the power grid resource allocation profile using a second plurality of solvers different from the plurality of MIP solvers, wherein each of the second plurality of solvers is configured to generate, at the second instant, a solution to the second power grid resource allocation profile that has a corresponding lower bound for the power grid resource allocation profile.

Example 11. The method of Example 10, wherein the second power grid resource allocation profile is a Lagrangian Relaxed (LR) function of the power grid resource allocation profile.

Example 12. The method of Example 5, wherein the first instant, the second instant, and the third instant are a same instant.

Example 13. The method of Example 5, wherein the first instant is different from the second instant, wherein the third instant is the first instant if the first instant is after the second instant, wherein if the first instant is before the second instant, the third instant is between the first instant and the second instant, is a same as the first instant, or is a same as the second instant.

Example 14. The method of Example 5, wherein generating the resource allocation schedule further comprises: in response to determining that the generated difference is larger than the pre-determined threshold, generating a second difference between a value of second upper bounds from the plurality of obtained convergence paths and a value of second lower bounds from the plurality of obtained convergence paths, wherein, at a fourth instant, each of the plurality of convergence paths comprises a second upper bound, wherein, at a fifth instant, each of the plurality of convergence paths comprises a second lower bound, and wherein, at a sixth instant, each of the plurality of convergence paths comprises a second intermediate resource allocation schedule, wherein the fourth instant, the fifth instant, and the sixth instant are after a latest of the first instant, the second instant, and the third instant; and generating the resource allocation schedule if the second difference is smaller than the pre-determined threshold, the resource allocation schedule corresponding to the second intermediate response allocation schedule of a convergence path associated with the value of the second upper bounds.

Example 15. In an embodiment, a system is configured to: generate, by a processor of a power management system of a power grid, a power grid resource allocation profile indicative of an operation of the power grid constrained by operational information of the power grid; generate, by the processor, a difference between a value of upper bounds from a plurality of obtained convergence paths and a value of lower bounds from the obtained convergence paths, the obtained convergence paths being based on a plurality of different initial conditions for the generated power grid resource allocation profile; and generate, by the processor, a resource allocation schedule for power grid resources operating within the power grid if the generated difference is smaller than a pre-determined threshold, the resource allocation schedule corresponding to a convergence path associated with the value of the upper bounds, the resource allocation schedule being configured to be received at the power grid resources.

Example 16. The system of Example 15, further comprising: a transmitter configured to transmit the resource allocation schedule to the power grid resources; and the power grid resources, wherein the power grid resources are configured to be controlled in accordance with the resource allocation schedule.

Example 17. The system of Example 15, wherein the system is further configured to: find, by the processor, a solution to the power grid resource allocation profile using a plurality of solvers, wherein each of the plurality of solvers is initialized with a different initial condition to obtain a different convergence path for each of the plurality of solvers, wherein each of the plurality of solvers converges along a different convergence path toward the solution to the power grid resource allocation profile.

Example 18. The system of Example 17, wherein, at a first instant, each of the plurality of obtained convergence paths comprises an upper bound, wherein, at a second instant, each of the plurality of obtained convergence paths comprises a lower bound, and wherein, at a third instant, each of the plurality of obtained convergence paths comprises an intermediate resource allocation schedule.

Example 19. The system of Example 18, wherein the system is further configured to: generate the difference by computing a difference between a minimum value of the upper bounds and a maximum value of the lower bounds.

Example 20. The system of Example 18, wherein the system is further configured to: generate the resource allocation schedule by choosing the intermediate resource allocation schedule of the convergence path associated with the value of the upper bounds as the resource allocation schedule.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   receiving a power grid resource allocation profile indicative of an operation of a power grid constrained by operational information of the power grid;
   solving the power grid resource allocation profile iteratively using a plurality of Mixed Integer Programming (MIP) solvers, wherein each of the plurality of MIP solvers is initialized with a different initial condition configuration, wherein each of the plurality of MIP solvers converges along a different convergence path to obtain a plurality of convergence paths;

calculating a difference between a minimum value of upper bounds from the plurality of convergence paths and a maximum value of lower bounds from the plurality of convergence paths; and stopping the plurality of MIP solvers when the calculated difference is smaller than a pre-determined threshold.

2. The method of claim 1, further comprising, after stopping the plurality of MIP solvers:

generating a resource allocation schedule for power grid resources operating within the power grid, wherein the resource allocation schedule is based on an intermediate resource allocation schedule of a convergence path associated with the minimum value of the upper bounds.

3. The method of claim 2, further comprising transmitting the resource allocation schedule to the power grid resources.

4. The method of claim 3, further comprising operating the power grid resources within the power grid in accordance with the transmitted resource allocation schedule.

5. The method of claim 1, wherein the operational information comprises information for constraining operation of the power grid and comprises security-related transmission constraint information and cost information.

6. The method of claim 1, further comprising:

generating the power grid resource allocation profile by formulating the power grid resource allocation profile as a Security Constrained Unit Commitment system based on mixed integer programming.

7. The method of claim 1, wherein solving the power grid resource allocation profile comprises:

solving, using a first plurality of MIP solvers, the power grid resource allocation profile, wherein each of the first plurality of MIP solvers is configured to generate a mixed-integer solution to the power grid resource allocation profile, wherein the mixed-integer solution has a corresponding upper bound for the power grid resource allocation profile.

8. The method of claim 7, wherein each of the first plurality of MIP solvers is further configured to generate an integer relaxed solution to the power grid resource allocation profile, wherein the integer relaxed solution has a corresponding lower bound for the power grid resource allocation profile.

9. The method of claim 7, wherein solving the power grid resource allocation profile further comprises:

solving, using a second plurality of MIP solvers, a second power grid resource allocation profile different from the power grid resource allocation profile, wherein the second plurality of MIP solvers are configured to generate a plurality of solutions to the second power grid resource allocation profile, wherein each of the plurality of solutions has a corresponding lower bound for the power grid resource allocation profile.

10. The method of claim 9, wherein the second power grid resource allocation profile is a Lagrangian Relaxed (LR) function of the power grid resource allocation profile.

11. A method comprising:

solving a power grid resource allocation profile using a first plurality of Mixed Integer Programming (MIP) solvers, wherein the power grid resource allocation profile is indicative of an operation of a power grid constrained by operational information of the power grid, wherein each of the first plurality of MIP solvers is initialized with a different initial condition configuration, wherein each of the first plurality of MIP solvers converges along a different convergence path to obtain a first plurality of convergence paths;

solving a Lagrangian Relaxed (LR) dual function of the power grid resource allocation profile using a second plurality of LR dual solvers, wherein each of the second plurality of LR dual solvers is initialized with a different initial condition configuration, wherein each of the second plurality of LR dual solvers converges along a different convergence path to obtain a second plurality of convergence paths;

calculating a difference between a minimum value of upper bounds from the first plurality of convergence paths and a maximum value of lower bounds from the second plurality of convergence paths; and generating a resource allocation schedule for power grid resources operating within the power grid if the calculated difference is smaller than a pre-determined threshold, the resource allocation schedule corresponding to a convergence path associated with the minimum value of the upper bounds.

12. The method of claim 11, further comprising:

transmitting the resource allocation schedule to the resources; and operating the resources in accordance with the resource allocation schedule.

13. The method of claim 11, wherein solving the LR dual function comprises:

formulating the LR dual function of the power grid resource allocation profile as a plurality of LR sub-dual functions, wherein each of the second plurality of LR dual solvers solves the plurality of LR sub-dual functions in parallel using a third plurality of MIP solvers.

14. The method of claim 13, wherein each of the second plurality of LR dual solvers is configured to solve the LR dual function by:

computing, in a first iteration, a tentative solution to the LR dual function by solving the plurality of LR sub-dual functions in parallel using the third plurality of MIP solvers; and after the first iteration:

calculating a correction value for a Lagrangian multiplier vector of the LR dual function;

checking if convergence has been achieved for the LR dual function;

checking if the tentative solution to the LR dual function is a feasible solution to the power grid resource allocation profile if convergence has been achieved; and if the tentative solution is infeasible, modifying the tentative solution such that the modified tentative solution is a feasible solution to the power grid resource allocation profile.

15. The method of claim 14, further comprising, after the first iteration:

updating the Lagrangian multiplier vector with the correction value if convergence has not been achieved; and after updating the Lagrangian multiplier vector, computing, in a second iteration, another tentative solution to the LR dual function by solving the plurality of LR sub-dual functions in parallel using the third plurality of MIP solvers.

16. The method of claim 14, wherein checking if the tentative solution to the LR dual function is a feasible solution comprises checking if coupling constraints of the power grid resource allocation profile are satisfied.

17. A system comprising:

one or more processors; and a non-transitory computer-readable storage medium storing a program to be executed by the one or more processors, the program including instructions for:

solving a power grid resource allocation profile using a first plurality of Mixed Integer Programming (MIP) solvers, wherein the power grid resource allocation profile is indicative of an operation of a power grid constrained by operational information of the power grid, wherein each of the first plurality of MIP solvers is initialized with a different initial condition configuration, wherein each of the first plurality of MIP solvers converges along a different convergence path to obtain a first plurality of convergence paths;

solving a Lagrangian Relaxed (LR) dual function of the power grid resource allocation profile using a second plurality of LR dual solvers, wherein each of the second plurality of LR dual solvers is initialized with a different initial condition configuration, wherein each of the second plurality of LR dual solvers converges along a different convergence path to obtain a second plurality of convergence paths;

generating a best upper bound (BUB) based on the first plurality of convergence paths and generating a best lower bound (BLB) based on the second plurality of convergence paths;

calculating a difference between the BUB and the BLB; and generating a resource allocation schedule for power grid resources operating within the power grid if the calculated difference is smaller than a pre-determined threshold, the resource allocation schedule corresponding to a convergence path associated with the BUB.

18. The system of claim 17, wherein the BUB is a minimum value of upper bounds from the first plurality of convergence paths.

19. The system of claim 18, wherein the BLB is a maximum value of lower bounds from the second plurality of convergence paths.

20. The system of claim 18, wherein each of the first plurality of MIP solvers is configured to generate a mixed-integer solution to the power grid resource allocation profile, the mixed-integer solution having a corresponding upper bound for the power grid resource allocation profile, wherein each of the first plurality of MIP solvers is further configured to generate an integer relaxed solution to the power grid resource allocation profile, the integer relaxed solution having a corresponding lower bound for the power grid resource allocation profile, wherein the BLB is a maximum value among lower bounds from the second plurality of convergence paths provided by the second plurality of LR dual solvers and the lower bounds of the integer relaxed solutions provided by the first plurality of MIP solvers.

* * * * *